United States Patent [19]

Rasmussen, Jr.

[11] 4,239,377
[45] Dec. 16, 1980

[54] PHOTOGRAPHIC PRINTER

[75] Inventor: William R. Rasmussen, Jr., Bloomington, Minn.

[73] Assignee: Lucht Engineering, Inc., Minneapolis, Minn.

[21] Appl. No.: 34,547

[22] Filed: Apr. 30, 1979

[51] Int. Cl.³ .............................................. G03B 29/00
[52] U.S. Cl. ...................................... 355/29; 83/575; 83/635
[58] Field of Search ............................ 355/13, 29, 28; 83/575–577, 635, 588, 698

[56] References Cited

U.S. PATENT DOCUMENTS

| 4,088,404 | 5/1978 | Zahn et al. | 355/29 |
| 4,135,810 | 1/1979 | Walter | 355/29 |

*Primary Examiner*—Richard A. Wintercorn
*Attorney, Agent, or Firm*—Schroeder, Siegfried, Ryan, Vidas, Steffey & Arrett

[57] ABSTRACT

An improved photographic printer of the type wherein photosensitive photographic material is automatically advanced through an exposure area and is marked intermediate adjacent exposures to facilitate the separation or cutting of the different exposures. The improvement consists of a marking system having elements movable in and out of the exposure area to mark the photographic material while it is in the exposure area but without obstructing the photographic material while it is being exposed. In a preferred embodiment, the marking system includes a punch carried by a rotatable eccentric member, the punch being carried in and out of the exposure area on rotation of the eccentric member. The eccentric member is biased to maintain the punch out of the exposure area and is provided with a camming surface engagable by a reciprocal member, cooperation between the reciprocal member and camming surface causing rotation of the eccentric member. The punch may be positioned, and the reciprocating member configured, such that the reciprocating member will activate the punch when the punch is in the exposure area.

9 Claims, 4 Drawing Figures

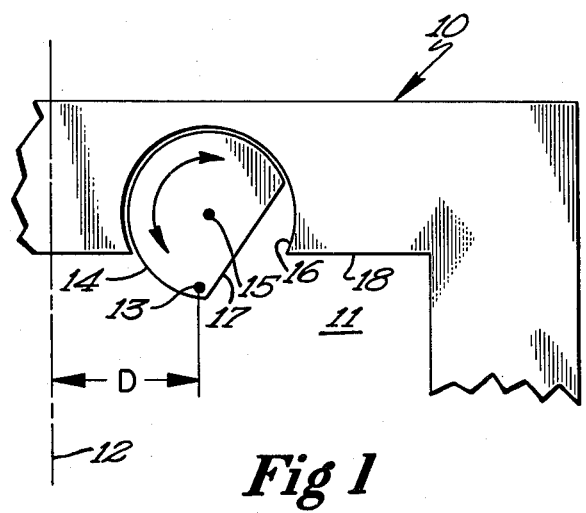
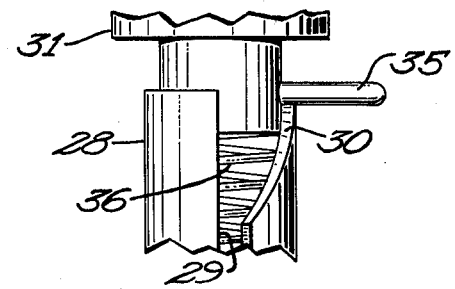
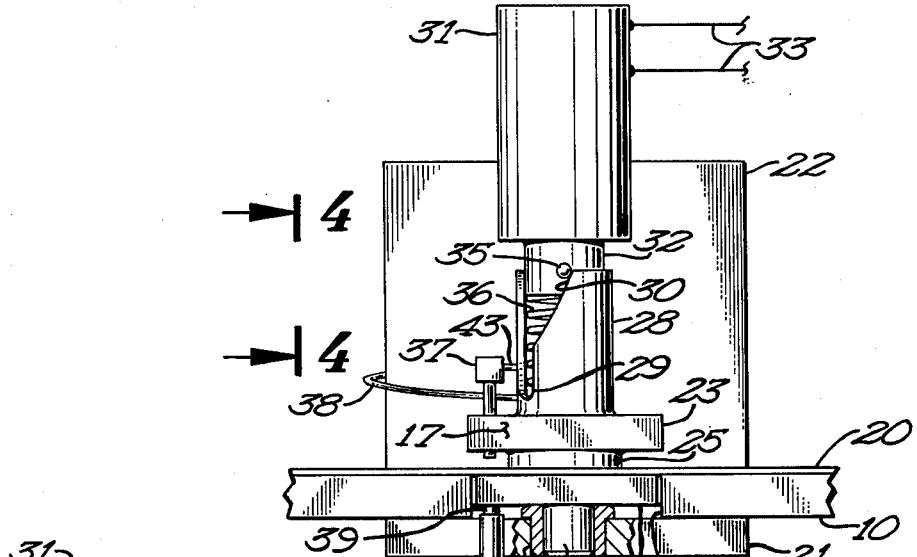
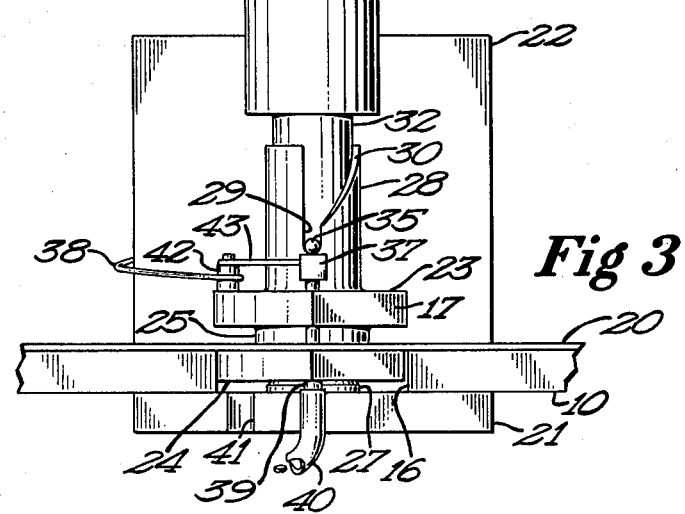

PHOTOGRAPHIC PRINTER

DESCRIPTION

BACKGROUND OF PRIOR ART

Photographic printers are known to the prior art. Automatic printers typically include supply and take-up rollers for photosensitive photographic material and a mechanism to automatically advance the material through an exposure area or station. The image to be exposed is established in known manner and projected on the photographic material in the exposure area. A shutter is employed to control the exposure. An example of one type of printer is disclosed in U.S. Pat. No. 3,951,545 issued Apr. 20, 1976 in the name of Orren J. Lucht for PHOTOGRAPHIC PRINT APPARATUS which is commonly owned with the present invention and which is hereby incorporated by reference.

In printers of the type described to this point, it is known to mark between adjacent exposed areas and to employ that mark to facilitate the subsequent separation or cutting of the individual exposures. While this marking technique has proven useful, it is also often cumbersome in that additional and precise movement of the photographic material is necessary in order to properly place the mark. That is, so as not to obstruct the photographic material within the viewing area, some prior art markers are positioned outside the exposure area and, thus, at a distance from the desired mark location when the photographic material is in the desired exposure position within the exposure area. In essence, these prior art marking systems require separate and independent advances of the photographic material to position that material for exposure and marking.

In addition to marker placement, the prior art marking systems have not been totally reliable. A common marking system is that sold by Kodak under the trademark EK 5 which employs a graphite wheel to place a mark on the photographic material. Such wheels can break or wear out resulting in the printer continuing its operation with the operator assuming that the marks are being made when, in fact, no marks are being placed on the photographic material. This results in additional expense in that additional handling is necessary in cutting when the marks are not in place.

BRIEF SUMMARY OF THE INVENTION

The present invention provides an improved photographic printer in that it provides a reliable and more efficient marking system for such printers. The marking system includes a member movable in and out of the exposure area to mark the photographic material in the exposure area and at the location it is positioned for exposure. In this manner, a mark is made between adjacent exposures without the necessity of advancing the photographic material for the sole and specific purpose of marking. In a preferred embodiment, a punch is carried by a rotatable eccentric, the rotation of the eccentric moving the punch in and out of the exposure area. The eccentric is biased to maintain the punch normally out of the exposure area and is provided with a camming surface. A reciprocating member cooperates with the camming surface to rotate the eccentric member and position the punch in punching relation with the photographic material within the exposure area. The punch is activated by the reciprocating member when it is in punching relation to the photographic material within the exposure area. A system for directing waste created by the punching operation away from the exposure area is also disclosed.

BRIEF DESCRIPTION OF THE DRAWINGS

FIG. 1 is a diagramatic illustration showing a concept underlying the present invention.

FIG. 2 illustrates a preferred embodiment of the present invention.

FIG. 3 illustrates the cooperation of the elements of the embodiment of FIG. 2 in performing the marking operation.

FIG. 4 is a view taken along the line 4—4 in FIG. 2 better illustrating the configuration of a portion of the embodiment of FIG. 2.

DETAILED DESCRIPTION OF THE INVENTION

FIG. 1 diagramatically illustrates a concept underlying the present invention. A frame 10, only a portion of which is shown, has a central opening 11, the central opening 11 defining the exposure area or station. The exposure area 11 may be shutter controlled to control the exposure of photographic material positioned therein, in known manner. The frame 10 surrounds the exposure area.

A center line 12 represents one optical center of the exposure area 11. Positioned a distance D from the center line 12 is a marking device indicated at 13. Marking device 13 may take any convenient form and, as illustrated in FIG. 1, the marking device 13 lies within the exposure area 11 to mark photographic material within the exposure area 11. A preferred marking device and its associated structure will be described more fully below.

Marking device 13 is carried on an eccentric member 14 which is pivotable about a pivot point 15. Eccentric member 14 lies within a cutout 16 in the frame 10 and is generally circular having a surface 17 lying along a cord of the circle. The radius of the circular portion of the eccentric member 14 is sufficient such that the eccentric member 14 can extend beyond the frame 10 into the exposure area. However, by rotation of the eccentric member 14 about the pivot point 15, in one position the surface 17 will be in alignment with the inner surface 18 of the frame 10 and no portion of the eccentric member 14 will extend into the exposure area. In this position, material in the exposure area 11 may be exposed without obstruction by the eccentric member 14.

In operation, photographic material it is desired to expose is advanced from a supply source from left to right until the edge of the desired exposure location travels past the center line 12 by the distance D. If the marker 13 does not then lie within the exposure area 11, the eccentric member 14 is rotated to the position illustrated in FIG. 1. The desired exposure edge is then in registry with the marker 13 and the marker 13 marks the photographic material. Rotation of the eccentric 14 withdraws the entirety of the eccentric member 14 from the exposure area 11 allowing the photographic material to be exposed without obstruction. The process is repeated for each desired exposure.

In most instances, that portion of the exposure area 11 lying to the right of center line 12 by a distance greater than the distance D will not be employed in the exposure of photographic print material. However, in some instances this results in a usable exposure area that is insufficient to accommodate a desired exposure size. In that instance, the edge of the desired exposure area is advanced past the center line 12 by the distance D, the edge of the desired exposure is marked as described above and the photographic material is advanced the additional distance necessary beyond the distance D to accommodate the desired exposure size. While this requires additional handling, the system of the present invention is still advantageous when prior art systems are considered, particularly in that only larger exposure sizes require a double movement.

Referring now to FIG. 2, there is illustrated a preferred embodiment of an eccentric member and marker which may be employed as described above with reference to marker 13 and eccentric member 14, respectively. In FIG. 2, exposure area 11 lies toward the viewer from the illustrated device and is defined by a frame 10 as illustrated in FIG. 1. Photographic print material 20 is positioned within the exposure area 11 defined by the frame 10.

Frame 10 is provided with an opening 16 as in FIG. 1. A plate 21 is secured to the underside of the frame 10 under the opening 16 and supports a back plate 22. The connections between the plate 21 and frame 10 and the plate 21 and back plate 22 may be accomplished in any known and desirable manner. The member corresponding to the eccentric member 14 of FIG. 1 is formed of upper and lower body portions 23 and 24, respectively. Body portions 23 and 24 are spaced from each other by an extending member 25 which has a smaller cross section than either of the members 23 and 24. The upper surface of the lower body member 24 is at the support level of the photographic print material 20. Each of the body members 23 and 24 have a cross section similar to that of the eccentric 14 of FIG. 1 with the flat surface lying generally at the plane of the drawing sheet in FIG. 2. Thus, as the body members 23 and 24 rotate they will extend into and withdraw from the exposure area defined by the frame 10, with the photographic print material lying between the body members 23 and 24 when they are within the exposure area.

A shaft 26 extends from body member 24 into plate 21 and is surrounded by a sleeve 27 to allow rotation of the shaft 26 within the plate 21. This is illustrated in FIG. 2 in partial cutaway. A tubular member 28 extends upwardly from the member 23 and has a portion of its side wall removed to provide an opening at 29, the side wall opening also providing a camming surface at 30 whose function will be described more fully below. The body members 23 and 24, extending portion 25, shaft 26 and tubular member 28 may be joined to each other in any desired manner or, preferably, may be formed as a unitary structure.

An actuable reciprocating device 31 is secured to the back plate 22 and has a rod 32 extending into the tubular member 28. The device 31 may be a pneumatic valve connected to a supply of pressurized fluid whose action is initiated by signals appearing on lines 33, in known manner, to cause the rod 32 to travel from the illustrated position to more fully penetrate tubular member 28.

FIG. 4 is a view of the embodiment of FIG. 2 taken along the line 4—4 in FIG. 2. As illustrated, the rod 32 has a lever 35 extending therefrom and into contact with the camming surface 30. On downward movement of the rod 32, the cooperation between the lever 35 and camming surface 30 imparts a rotational force to the entirety of the member formed by the elements 23–26 and 28. A spring 36 within tubular member 28 returns the rod 32 to the position illustrated in FIG. 2 on deactivation of the device 31. A punch 37 is carried by the member 23 while a spring 38 biases the elements in the position illustrated in FIG. 2, both of which will be described more fully with reference to FIG. 3. A fitting 39 is provided in the member 24 in alignment with the punch 37 and has a tube 40 affixed thereto which will also be described more fully with reference to FIG. 3.

FIG. 3 illustrates the cooperation of the elements during activation of the device 31 and travel of the rod 32. As the rod 32 travels downward, the lever 35 engages the camming surface 30 imparting a rotational force thereto causing elements 23–25 and 28 to rotate. In FIG. 2, none of these elements overlie the exposure area. However, on rotation to the position illustrated in FIG. 3, a portion of the print material within the exposure area lies between the members 23 and 24. Specifically, that portion of member 23 that overlies the photographic material in the position illustrated in FIG. 3 carries the punch 37. A bore in element 23 allows the punch 37 to extend through the member 23 and into contact with the photographic material 20. An aligned bore in member 24 accepts the punch tip to assure penetration of the photographic material 20. The bore in member 24 is provided with a fitting 39 which is adapted for connection to tubing 40, the tubing 40 directing waste material produced by the punching operation away from the exposure area. A recess 41 is provided in plate 21 to accommodate the fitting 39 and tubing 40 when in the position illustrated in FIG. 2.

A post 42 is carried by the member 23 and has a spring 43 secured thereto. The spring 43 extends to and engages the punch 37 maintaining it normally in a position where it does not fully penetrate the bore in member 23. Cooperation between the spring 43 and the punch 37 may take any convenient form. Preferrably, the punch 37 is provided with a head to facilitate securement of the spring thereto as well as to facilitate activation of the punching process as is described more fully below. A spring 38 extends from the back plate 22 around the post 42 to bias the system in the position illustrated in FIG. 2.

Following cooperation of the lever 35 and camming surface 30 to rotate the elements to the position illustrated in FIG. 3, the lever 35 extends over and is engagable with the head of the punch 37 on further travel. The opening 29 in the tubular member 28 is configured to allow such movement and, on such further travel, punch 37 is activated by being driven through the bore in member 23, through the photographic material 20 and into the bore in member 24, the member 24 supporting the paper 20 during the punching operation. On deactivation of the device 31, the spring 36 (see FIG. 2) returns the rod 32 to the position illustrated in FIG. 2 while spring 38 biases the other elements in the position illustrated in FIG. 2. In this manner, the elements that effected a marking by the punching of photographic material within the exposure area are withdrawn so as to not obstruct the exposure of that material.

Obviously, many modifications and variations of the present invention are possible in light of the above teachings. For example, the device 31 need not be pneumatic but, instead, may take the form of a solenoid. However, the pneumatic arrangement is believed preferable for its ability to deliver greater power thus assuring a completion of the punching process even with a dull punch. The punch end may take any desired form suitable for punching photographic print material. Also, the members 23 and 24 need not take the eccentric circle shape disclosed but, instead, may be of any desirable shape consistent with the member 23 carrying the punch to the desired location with the member 24 providing support for the photographic material during the punching operation. It is therefore to be understood that, within the scope of the appended claims, the invention may be practiced other than as specifically described.

I claim:

1. In a photographic printer of the type wherein photosensitive photographic material is automatically advanced through an exposure area and having means for marking said photographic material intermediate adjacent exposure locations, the improvement wherein said marking means comprises means rotatable between a first position wherein said marking means is out of said exposure area and a second position wherein said marking means is in marking relation with photographic material within said exposure area.

2. The photographic printer of claim 1 wherein said rotatable means comprises punch means.

3. The photographic printer of claim 1 wherein said rotatable means comprises camming surface means, said marking means further comprising means selectively engaging said camming surface means for rotating said rotatable means from said first to said second position.

4. The photographic printer of claim 3 wherein said selectively engaging means comprises selectively reciprocal means.

5. The photographic printer of claim 4 wherein said reciprocal means continues its travel following rotation of said rotatable means to said second position, said punch means being within the path of said reciprocal means when said rotatable means is in said second position and being actuated by the continued travel of said reciprocal means.

6. The photographic printer of claim 5 wherein said rotatable means is biased in said first position.

7. The photographic printer of claim 6 further comprising means for directing waste away from said exposure area.

8. The photographic printer of claim 7 wherein said reciprocal means comprises pneumatic means.

9. The photographic printer of claim 7 wherein said reciprocal means comprises solenoid means.

* * * * *